United States Patent [19]
Norwood

[11] 3,943,599
[45] Mar. 16, 1976

[54] METHOD AND APPARATUS FOR SEATING POULTRY FEATHER PLUCKING FINGERS

[75] Inventor: Haskell J. Norwood, Geraldine, Ala.

[73] Assignee: Gainesville Machine Company, Inc., Gainesville, Ga.

[22] Filed: Apr. 17, 1974

[21] Appl. No.: 461,702

[52] U.S. Cl. ............................................. 17/1 R
[51] Int. Cl.$^2$ ........................................ A22C 21/00
[58] Field of Search......... 17/67, 11, 11.1 A, 11.1 R, 17/1 R

[56] References Cited
UNITED STATES PATENTS

| | | | |
|---|---|---|---|
| 1,452,098 | 4/1923 | Short | 17/26 |
| 2,004,581 | 6/1935 | Meyer | 17/11.1 R |

Primary Examiner—Robert Peshock
Attorney, Agent, or Firm—Newton, Hopkins & Ormsby

[57] ABSTRACT

A method is disclosed for mounting a resilient poultry feather plucking finger to a rigid finger support with a peripheral groove in a head portion of the finger seated snugly within an aperture in the finger support and with an elongation portion of the finger projecting out from the finger support aperture. The method comprises the steps of passing at least part of the elongation portion of the finger through the finger support aperture and through a pair of spaced counterrotating drive rollers which urge the finger head portion into the support aperture and seat the peripheral groove therewithin.

Apparatus is also disclosed for seating resilient poultry feather plucking fingers in apertures formed in rigid finger supporting structures. The apparatus comprises a support member and a drive shaft rotatably supported by the support member and adapted to be coupled with electromotive drive means. A first roller is mounted to the drive shaft. A second roller is rotatably mounted to the support member in spaced juxtaposition with the first roller. Gear means couple the first and second rows together in a one to one gearing ratio.

4 Claims, 2 Drawing Figures

METHOD AND APPARATUS FOR SEATING POULTRY FEATHER PLUCKING FINGERS

BACKGROUND OF THE INVENTION

Today, poultry processing plants commonly employ machines for picking or plucking feathers from poultry. Such machines, which are exemplified by those illustrated in U.S. Pat. Nos. 3,044,108, 3,197,809, 3,203,035, 3,234,587, 3,234,588, 3,235,904, 3,747,159, typically employ drums or discs having sets of holes or apertures in which resilient feather plucking fingers of unitary rubber construction are mounted. As shown in detail in U.S. Pat. No. 3,203,035 the feather plucking fingers typically comprise a head portion having a peripheral groove seated within an aperture formed in the drum or plate. From the head portion extends an elongation portion which includes a shank and a feather plucking section. The feather plucking section is provided with a furrowed surface which, when moved against feathers, tends to pluck them from the skin of the birds. To achieve this action the birds are directed over the drums which rotate and thereby urge the fingers against the bird feathers.

Poultry feather plucking machines of the type just described employ a relatively large number of feather plucking fingers. Ordinarily, these fingers are mounted directly to the supporting drum or plate by hand. This is accomplished by manually inserting the feather plucking sections of the fingers through the holes until the base portions engage the hole lips. From this point it is necessary to apply substantial force in urging the grooves formed about the peripheries of the finger heads into seating relation within the apertures. This application of substantial force is both fatiguing to the assembler as well as time-consuming and costly.

General objects of the invention are thus to provide improved methods and apparatuses for seating resilient poultry feather plucking fingers within apertures formed in rigid finger supporting structures.

SUMMARY OF THE INVENTION

In a preferred form of the invention a method is provided for mounting a resilient poultry feather plucking finger to a rigid finger support with a peripheral groove in the head portion of the finger seated snugly within an aperture of the finger support, and with an elongation portion of the finger projecting outwardly from the finger support aperture. The method comprises the steps of passing at least part of the elongation portion of the finger through the finger support aperture and through a pair of spaced counterrotating drive rollers which urge the finger head portion into the support aperture and seat the peripheral groove therewithin.

In another preferred form of the invention apparatus is provided for seating resilient poultry feather plucking fingers in apertures formed in rigid finger supporting structures. The apparatus comprises a support member, a drive shaft rotatably supported by the support member and adapted to be coupled with electromotive drive means. A first roller is connected to the drive shaft. A second roller is rotatably mounted to the support member in spaced juxtaposition with the first roller. Gear means couple the first and second rollers together.

DETAILED DESCRIPTION OF THE DRAWING

Figures 1, 2:
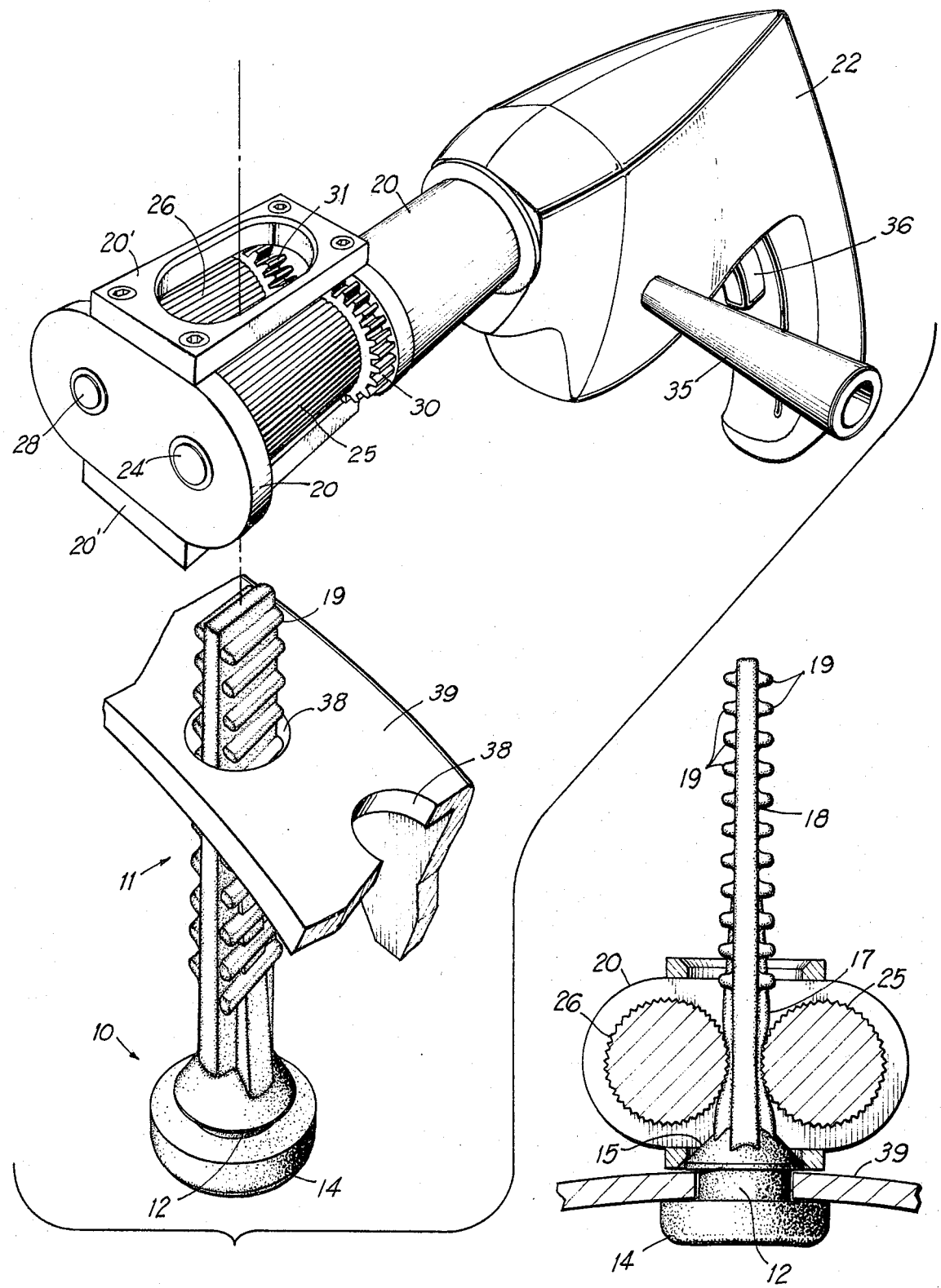
FIG. 1 is an exploded view in perspective of a feather plucking finger and finger support shown together with a perspective view of apparatus embodying principles of the invention in one preferred form which apparatus may be used in practicing methods embodying principles of the invention in preferred forms.
FIG. 2 is a side elevational view, partly in cross section, of the apparatus shown in FIG. 1 depicted in position having seated a poultry feather plucking finger within an aperture formed in a rigid finger supporting structure.

Referring now in more detail to the drawing, there is shown apparatus for seating resilient poultry feather plucking fingers within apertures of rigid finger supporting structures. The finger shown is exemplary of those in current use. The one chosen here for illustrating the inventive methods and apparatuses is seen to be of unitary rubber construction and seen to include a head portion 10 from which an elongation portion 11 extends. The head portion includes a peripheral groove or indentation 12 situated between a base section 14 and a conical section 15 of the head. From the conical head section extends a shank section 17 of the elongation portion of the finger to a furrowed feather plucking section 18. The furrowed feather plucking section includes a set of spaced ridges 19 upon opposite sides thereof.

The apparatus used in mounting the fingers may be easily fabricated from fractional horsepower electric drills in common use today. The apparatus includes a support 20 a portion of which projects outwardly from a housing 22 in which an electric motor is operatively housed. A drive shaft 24 is journalled within a bearing in an end portion of support 20 which shaft is adapted for rotation upon energization of the electric motor. A first roller 25 is rigidly mounted to shaft 24. A second roller 26 is secured about a shaft 28 journalled within bearings formed in support 20 with the second roller disposed in spaced juxtaposition with the first roller. A gear 30 is rigidly secured to drive shaft 24 and the first roller 25 in one to one gearing ratio mesh with a gear 31 rigidly secured to the second roller 26 and shaft 28. These gears are rotatably disposed beneath a protective covering portion 20' of support 20 which portion has a central aperture therethrough. A similarly apertured protective cover portion is disposed on the opposite side of the rollers in alignment with the first cover portion of support 20. With this configuration of assembly elongation portions of fingers may pass in frictional engagement through the first and second rollers and freely through the two protective covering portions of the support. A handle 35 is provided for manual gripping as is a trigger 36 used to energize the motor.

A poultry feather plucking finger such as that of the type just described may be seated within an aperture 38 of a finger supporting structure 39 by manually passing the furrowed plucking section 18 through the support aperture and manually positioning the finger seating apparatus with the two counterrotating rollers in engagement with the end of the finger. As the spacing between these rollers is slightly less than the width of section 18 the rollers frictionally engage the finger and pull the furrowed portion thereof through the space between the rollers upon energization of the apparatus motor. As the conical section 15 of the finger head portion contacts the periphery of aperture 38 substantial resistance is encountered by the finger. This resistance is sensed by the operator holding the apparatus as an abrupt pull. The operator may permit this to be translated into moving the seating apparatus itself towards the finger support surface thereby bringing support portion 20' into engagement with the top of the support 39. With the apparatus support now in abutment with the rigid finger support the counterrotating rollers force the conical section of the finger head portion on through support aperture 38 bringing the base portion 14 of the head into abutment with the bottom of the finger support surface 39. Upon this engagement the counterrotating rollers encounter greatly enhanced resistance which actuates an overload switch within housing 22 terminating motor energization and the drive imparted to shaft 24 and to the rollers.

If desired, the just-described method may be modified by placing support portion 20' in abutment with the upper surface of finger support 39 prior to the manual passage of the finger elongation portion through aperture 38. The finger may then be inserted through the aperture manually into contact with the counterrotating rollers which then frictionally engage the finger and urge it through the rollers and the head portion into seating position within the aperture. Once seated, an unshown motor reverse trigger may be depressed driving the rollers in opposite counterrotational directions thereby running the rollers up and off the fingers.

It should be understod that the just-described apparatus and methods merely illustrate principles of the invention in selected preferred forms. Many modifications may, of course, be made to the apparatus and methods specifically described without departure from the spirit and scope of the invention as set forth in the following claims.

What is claimed is:

1. A method of mounting a resilient poultry feather plucking finger to a rigid finger support with a peripheral groove in a head portion of the finger seated snugly within an aperture in the finger support and with an elongation portion of the finger projecting outwardly from the finger support aperture, said method comprising the steps of passing at least part of the elongation portion of the finger through the finger support aperture and through a pair of spaced counterrotating drive rollers which urge the finger head portion into the support aperture and seat the peripheral groove therewithin.

2. The method of claim 1 wherein at least part of the elongation portion of the finger is passed through the pair of spaced counterrotating drive rollers in simultaneous frictional engagement with each of the rollers.

3. The method of claim 1 wheren the pair of spaced counterrotating drive rollers are rotatably mounted to a mobile roller support, and wherein the roll support is manually laid upon the rigid finger support about the finger support aperture as the counterrotating drive rollers urge the finger head portion into the finger support aperture.

4. The method of claim 3 wherein the mobile roller support is moved manually towards the finger support aperture while the elongation portion of the finger is being passed through the counterrotating drive rollers.

* * * * *